WRIST BAND LINKAGE

Original Filed April 15, 1965

Inventor
Walter S. Carlson
By his Attorney
Richard C. Wise

United States Patent Office

Re. 26,932
Reissued July 7, 1970

26,932
WRIST BAND LINKAGE

Walter S. Carlson, North Attleboro, Mass., assignor, by mesne assignments, to Textron Inc., Providence, R.I., a corporation of Delaware Original No. 3,324,649, dated June 13, 1967, Ser. No. 448,298, Apr. 15, 1965. Application for reissue June 9, 1969, Ser. No. 848,365

Int. Cl. F16g *13/24*

U.S. Cl. 59—79 6 Claims

Matter enclosed in heavy brackets [ ] appears in the original patent but forms no part of this reissue specification; matter printed in italics indicates the additions made by reissue.

*ABSTRACT OF THE DISCLOSURE*

*A flexible, articulated wrist band linkage comprising a plurality of links joined by a plurality of essentially U-shaped linking members, the linkage including a series of mounting members each of which has four pairs of mounting channels formed by two pairs of ears adjacent to one end and two pairs adjacent to the other end with each channel alapted to rotatably receive and cooperate with a leg of a U-shaped linking member and means for retaining the linking members in the mounting channels, whereby a plurality of links may be joined in a flexible articulated linkage. According to the preferred embodiment the legs of the linking members are provided with notches and the means for retaining them in the mounting channels includes means associated with the mounting member which are engateable within the notches.*

*BACKGROUND OF THE INVENTION*

This invention relates to a flexible, articulated bracelet and, more particularly, to a bracelet for use as a wrist band for a watch comprising a plurality of discrete links joined by relatively resilient means to provide sufficient flexibility to ensure comfort to the user while permitting that amount of expansion encountered in normal usuage and simultaneously preventing loss due to over expandability.

The early efforts of the skilled artisans working in the bracelet or wrist band art, as manifiested in prior art patents, generally produced substantially rigid bracelets, lacking in both flexibility and resiliency or expandability. Subsequent research activity directed toward provision of a wrist band capable of a maximum degree of expansion has been successful but has produced bracelets of extremely complex structure. That is, although the prior art teaches bracelets having a high degree of flexibility and expansion, the commerically acceptable bracelets of the art comprise a relatively large number of intricate components linked in a complex structure. Consequently, the art is essentially limited to substantially rigid bracelets or flexible bracelets of complex structure permitting a degree of expansion substantially above that required in normal usage. While complexity is not per se undesirable, it does unavoidably result in higher cost of manufacture and repair. Further, and more important in an article of this nature, a structurally complex wrist band is difficult to disassemble and, therefore, alterations necessary to adjust the length of a bracelet for a particular user cannot be readily accomplished. A further problem encountered with wrist bands having a high degree of expandability is the likelihood that the wrist band will slip off the users wrist when the user is involved in activities requiring extensive motion of the wrist.

Accordingly, an object of the present invention is to provide a flexible wrist band having sufficient resiliency to permit that amount of expansion encountered in normal usage.

A further object of this invention is to provide a flexible, articulated wrist band which may be readily adjusted in length.

A still further and more specific object of this invention is to provide a flexible, articulated wrist band comprising discrete links joined by resilient means which is of relatively uncomplex structure.

To this end and in accordance with a feature of this invention there is provided a flexible, articulated wrist band comprising a plurality of discrete links resiliently joined by a plurality of essentially U-shaped linking members, each of said links comprising a mounting member having a plurality of channels formed on ears extending outwardly therefrom and adapted to receive a leg of one of said U-shaped linking members and means for retaining said U-shaped members in position in said channels.

The above and other features of the invention will now be more particularly described with reference to the accompanying drawings and pointed out in the claims.

The principles and features of this invention may be employed in varied and numerous embodiments without departing from the scope of the invention.

Figure 1:
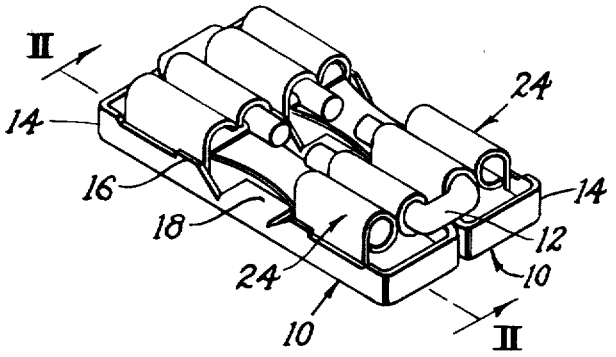
FIG. 1 is a perspective view on enlarged scale showing a portion of a wrist band embodying features of the subject invention in normally inverted position.
Figure 5:
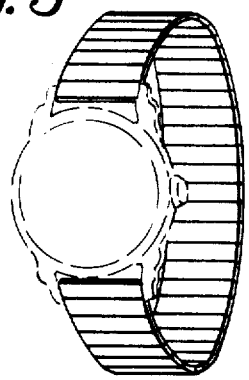
FIG. 5 is a perspective view, on a smaller scale, of a wrist band for a watch embodying the invention.

As illustrated in FIG. 1, the subject invention generally comprises a plurality of links 10 joined by essentially U-shaped linking member 12. A complete wrist band, as seen in FIG. 5, may be formed by joining an appropriate number of links 10 in the manner illustrated in FIG. 1 and hereinafter described in detail. An article such as a watch may be joined to the ends of the wrist band, as shown in FIG. 5, in conventional manner.

Each of the links 10 comprises an outer, dished cover 14 having a depending (when assembled in a completed band) skirt 16 extending around the periphery thereof. The dished cover 14 is used as a support or base upon which the remainder of the link 10 is assembled, as hereinafter described. The outer surface 15 of the cover 14 may be decorated in any desired manner whereby a plurality thereof may be combined to provide wrist bands of varied and attractive designs. As particularly illustrated in FIG. 4, portions of the skirt 16 are removed to provide tabs 18, 18 certainly located on opposite sides of the main body of the cover 14.

Figure 3:
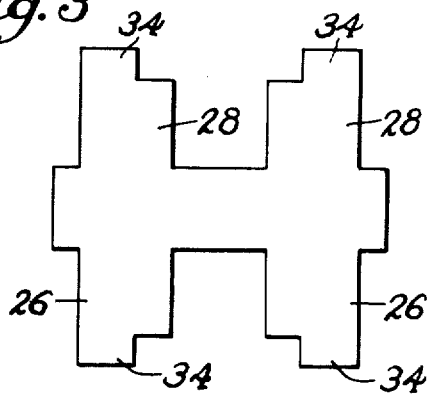
FIG. 3 is a top plan view of one of the component blanks used to form one of the links of the wrist band illustrated in FIG. 1.
Figure 4:
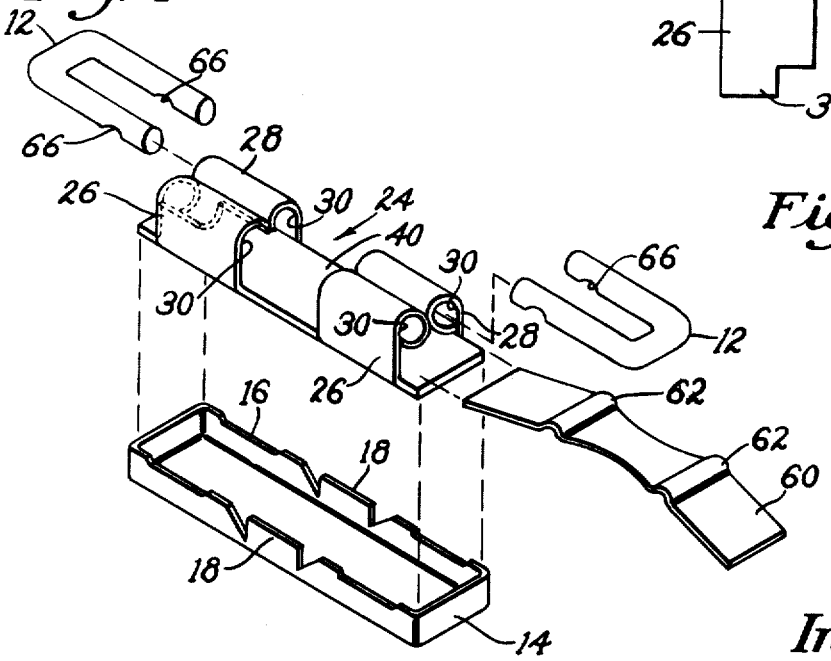
FIG. 4 is an exploded view showing the components of one link of the wrist band of the subject invention also in normally inverted position.

A plurality of links 10 are flexibly or pivotally joined in abutting relation to form a wrist band by the cooperative action of the U-shaped members 12 and mounting members 24. The mounting members 24 are formed from metal bands as illustrated in FIG. 3. Ears 26 and 28 on the metal blanks are folded upwardly and mounting channels 30 (FIG. 4) formed in the terminal portion thereof by wrapping an extension 34 of said ears back into contact with the main portion of said ears 26, 28. As best illustrated in FIG. 4, each mounting member 24 comprises an elongated base portion 40 having a plurality of upstanding ears 26, 28 located on opposite ends thereof, each of said ears 26, 28 having a mounting channel 30 formed therein which is adapted to receive one leg of a U-shaped member 12, as hereinafter described.

The mounting channels 30 on the ears 26, 28 are displaced from the base portion 40 of the mounting member 24 a distance sufficient to permit a leaf spring 60 to be slid thereunder whereby the leaf spring may be centrally positioned on the mounting means. Each leaf spring 60 has two displaced holding projections 62, 62 formed therein extending transversely thereof which cooperate with notches 66 in the U-shaped members 12 to retain said U-shaped members in position, as hereinafter described. In order to insert a leaf spring 60 into position on a mounting member 24, it must be depressed and slid between the ears 26, 28 and under the channels 30. The leaf spring [24] *60* will thereafter be retained in position by the ears 26, 28 and channels 30 until it is depressed and removed.

Figure 2:
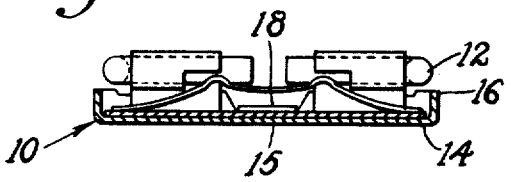
FIG. 2 is a sectional view taken along line II—II of FIG. 1.

A link 10 is assembled by centrally locating a leaf spring 60 on a mounting member 24 and thereafter inserting the mounting member 24 in the dished portion of a cover 14 whereby the skirt 16 circumscribes the base portion 40 of the mounting member 24. The mounting member 24 and the cover 14 are secured together by folding the tabs 18 inwardly into engagement with the exposed surface of the base portion 40, as best illustrated in FIG. 2.

As illustrated in FIG. 1, adjacent links 10 are joined by inserting the legs of a U-shaped member 12 into the appropriate channels 30 formed in the mounting members 24 of adjacent links 10. That is, the opposite legs of each U-shaped member 12 are inserted into adjacent channels 30 formed on the mounting members of consecutive links 10. The U-shaped members 12 are retained in position by engagement of the notches 66 formed thereon with the holding projections 62, 62 on the leaf springs 60 associated with each link 10. A plurality of links may thus be securely and flexibly jointed. The structural character of the U-shaped members 12 permits a degree of relative movement between the legs thereof and, thus, provides resiliency in a bracelet formed in the manner described above. That is, when a plurality of links 10 are joined by a plurality of U-shaped members 12 as aforesaid, the aggregation of U-shaped members 12 produces a resilient wrist band which permits that amount of expansion encountered in normal usage but preventing the band from inadvertently coming off the wearer as is common with the extremely spandable bands of the prior art, particularly when worn while the wearer is participating in athletics.

A bracelet constructed in the manner described above may readily be adjusted in length by removing a desired number of links 10 by withdrawal of the appropriate U-shaped members 12. The wrist band of the subject invention is thus structurally simple, flexible and resilient to the degree required, and readily adjustable in length.

Having thus described my invention, what I claim as new and desire to secure by Letters Patent of the United States is:

1. A flexible, articulated wrist band *linkage* comprising a plurality of discrete links [resiliently] joined by a plurality of *separate U-shaped* linking members *each comprising a pair of legs connected by a bight;* [each of] said [links]*linkage* comprising a *series of* mounting members *each mounting member* having a [plurality of] *first pair of* mounting channels formed [on] *by a first pair of* ears extending therefrom *adjacent to one end* and adapted to *rotatably* receive and cooperate with [a] *the legs of a first pair of said separate U-shaped* linking members*, and each mounting member having a second pair of mounting channels formed by a second pair of ears extending from adjacent to the opposite end thereof and adapted to rotatably receive and cooperate with the legs of a second pair of said separate U-shaped linking members,* whereby a plurality of said links may be [resiliently] joined and means for retaining said linking members in said mounting channels.

[2. A flexible, articulated wrist band comprising a plurality of discrete links resiliently joined by a plurality of essentially U-shaped linking members; each of said links comprising a mounting member having a plurality of mounting channels formed on ears extending therefrom and adapted to receive a leg of one of said U-shaped linking members whereby a plurality of said links may be resiliently joined.]

3. A flexible, articulated wrist band *linkage according to claim 1* [comprising a plurality of discrete links resiliently joined by a plurality of essentially U-shaped linking members; each of said links comprising a mounting member having a plurality of mounting channels formed on ears extending therefrom and adapted to receive a leg of one of said U-shaped linking members whereby a plurality of said links may be resiliently joined] *wherein the* means for retaining said linking members in said mounting channels [comprising] *comprises* spring means engageable with the legs of said linking members.

4. A flexible articulated wrist band linkage *according to claim 1* [comprising a plurality of discrete links resiliently joined by a plurality of] *wherein the* [essentially] U-shaped linking members [having] *each have* a notch formed in [the terminal portion of each ]*its* leg [thereof]; [each of said links comprising a mounting member having a plurality of mounting channels formed on ears extending from a base portion thereof and adapted to receive a leg of one of said U-shaped members whereby a plurality of said links may be resiliently joined] and *said* means for retaining said linking members in said mounting channels [comprising a leaf spring having a plurality of holding projections thereon] *comprises means* engageable within said notches.

[5. A flexible, articulated wrist band comprising a plurality of discrete links resiliently joined by a plurality of linking members; each of said links comprising a cover, a mounting member having a plurality of mounting channels formed on ears extending therefrom and adapted to receive and cooperate with a linking member whereby a plurality of said links may be resiliently joined and means for retaining said linking members in said mounting channels.]

6. A flexible, articulated wrist band *linkage* comprising a plurality of discrete links [resiliently] joined by a plurality of essentially U-shaped linking members; each of said links comprising a cover having a depending skirt extending around the periphery thereof, a mounting member mountable on said cover within said depending skirt and having a plurality of mounting channels formed on ears extending there from and adapted to receive a leg of one of said U-shaped linking members whereby a plurality of said links may be [resiliently] joined.

7. A flexible, articulated wrist band *linkage* comprising a plurality of discrete links [resiliently] joined by a plurality of essentially U-shaped linking members; each of said links comprising a cover, a mounting member having a plurality of mounting channels formed on ears extending therefrom and adapted to receive a leg of one of said U-shaped linking members whereby a plurality of said links may be [resiliently] joined, and means for retaining said linking members in said mounting channels comprising spring means engageable with the legs of said linking members.

8. A flexible, articulated wrist band *linkage* comprising a plurality of discrete links [resiliently] joined by a plurality of essentially U-shaped linking members having a notch formed in [the terminal portion of] each leg thereof; each of said links comprising a cover having a depending skirt extending around the periphery thereof, a mounting member mountable on said cover within said depending skirt and having a plurality of mounting channels formed on ears extending from a base portion thereof and adapted to receive a leg of one of said U-shaped members whereby a plurality of said links may be [resiliently] joined and means for retaining said linking members in said mounting channels comprising a leaf spring having a plurality of holding projections thereon engageable within said notches.

References Cited

The following references, cited by the Examiner, are of record in the patented file of this patent or the original patent.

UNITED STATES PATENTS

| | | | |
|---|---|---|---|
| 1,712,564 | 5/1929 | Jones | 59—80 |
| 2,689,450 | 9/1954 | Stiegele | 59—79 |

FOREIGN PATENTS

| | | |
|---|---|---|
| 1,017,827 | 10/1957 | Germany. |
| 1,022,401 | 1/1958 | Germany. |
| 1,023,619 | 1/1958 | Germany. |

CHARLES W. LANHAM, Primary Examiner

G. P. CROSBY, Assistant Examiner